(12) United States Patent
Cutler et al.

(10) Patent No.: US 8,743,684 B2
(45) Date of Patent: Jun. 3, 2014

(54) GPRS DEFAULT BEARER TRACKING

(75) Inventors: Kevin Scott Cutler, Carp (CA); Kalyan Premchand Siddam, Nepean (CA); Stephen Ellis, Ottawa (CA)

(73) Assignee: Alcatel Lucent, Paris (FR)

( * ) Notice: Subject to any disclaimer, the term of this patent is extended or adjusted under 35 U.S.C. 154(b) by 479 days.

(21) Appl. No.: 13/034,397

(22) Filed: Feb. 24, 2011

(65) Prior Publication Data

US 2012/0218888 A1    Aug. 30, 2012

(51) Int. Cl.
    *H04L 12/28*      (2006.01)
    *H04L 29/08*      (2006.01)

(52) U.S. Cl.
    CPC ..................................... *H04L 67/32* (2013.01)
    USPC .......................................................... 370/230

(58) Field of Classification Search
    CPC ....................................................... H04L 67/32
    USPC .......................................................... 370/230
    See application file for complete search history.

(56) References Cited

U.S. PATENT DOCUMENTS

2011/0317557 A1*   12/2011   Siddam et al. ................ 370/232

OTHER PUBLICATIONS

ETSI TS 129 212 V9.2.0 (Apr. 2010), Universal Mobile Telecommunications System (UMTS); LTE; Policy and charging control over Gx reference point (3GPP TS 29.212 version 9.2.0 Release 9), European Telecommunications Standards Institute 2010, pp. 1-115.
ETSI TS 129 213 VP.2.0(Apr. 2010) Digital cellular telecommunications system (Phase 2+); Universal Mobile Telecommunications System (UMTS); LTE; Policy and charging control signalling flows and Quality of Service (QoS) parameter mapping (3GPP TS 29.213 version 9.2.0 Release 9), European Telecommunications Standards Institute 2010, pp. 1-131.
ETSI TS 129 214 V9.2.0 (Apr. 2010), Universal Mobile Telecommunications System (UMTS); LTE; Policy and charging control over Rx reference point (3GPP TS 29.214 version 9.3.0 Release 9), European Telecommunications Standards Institute 2010, pp. 1-48.
3GPP TS 23.203 V8.1.1 (Mar. 2008), 3rd Generation Partnership Project; Technical Specification Group Services and System Aspects; Policy and charging control architecture (Release 8), 2008, 3GPP Organizational Partners (ARIB, CCSA, ETSI, TTA, TTC), pp. 1-87.

* cited by examiner

*Primary Examiner* — Wanda Z Russell
(74) *Attorney, Agent, or Firm* — Kramer & Amado, P.C.

(57) ABSTRACT

The invention is directed to providing a method and apparatus for managing and tracking default bearers in an Internet Protocol Connectivity Access Network (IP-CAN) session of a General Packet Radio Service (GPRS) network while observing the requirements of the GPRS specifications.

16 Claims, 4 Drawing Sheets

GPRS DEFAULT BEARER TRACKING

FIELD OF THE INVENTION

The invention is directed to packet switching communication networks, and in particular to default bearer management in General Packet Radio Service (GPRS) networks.

BACKGROUND OF THE INVENTION

The 3rd Generation Partnership Project (3GPP) provides system specifications for third-generation (3G) mobile networks including General Packet Radio Service (GPRS) networks and Long Term Evolution (LTE) networks. LTE is also referred to as evolved packet system (EPS). GPRS networks and LTE networks provide session management and transport for Internet Protocol (IP) packet services. A policy control and charging (PCC) architecture allows operators to perform service-based Quality of Service (QoS) policy and flow-based charging control.

The 3GPP generally describes the components of the GPRS networks and LTE networks and their interactions with each other in a number of technical specifications. Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF). These specifications further provide some guidance as to how these elements interact in order to provide reliable data services and charge subscribers for use thereof. The 3GPP specification allows the Policy and Charging Control (PCC) architecture to interwork with older generation networks (e.g., General Packet Radio Service (GPRS)) as well as newer LTE networks. For example, 3GPP TS 29.212 and 3GPP TS 29.214 provide some guidance on the establishment of an application session upon receipt of an application request from an Application Function (AF) in the form of an AA-Request (AAR) message or from a Packet Data Network Gateway (PGW) in the form of a Credit Control Request (CCR) message. The standards specify that the PCRF is responsible for receiving new service requests, creating new PCC rules commensurate with such requests, and providing these new PCC rules to a Policy and Charging Enforcement Function (PCEF) for installation. The 3GPP standards also define the format of service request messages and PCC rules.

GPRS and EPS differ in how bearer management is handled. In GPRS bearer management and bearer negotiation is done explicitly to manage flows. In EPS, bearer management is handled invisibly. Also, in EPS a new attribute value pair (AVP) is introduced to specifically talk to the default bearer "Default-EPS-Bearer-QoS" and it defines the QoS information for the EPS default bearer and provides for QoS Class Identifier (QCI) and Allocation Retention Priority (ARP) information, which Indicates a priority for accepting or rejecting a bearer establishment or modification request. In the GPRS specification, there is no concept of a default bearer.

Therefore, a means of managing default bearers in a GPRS network is highly desirable.

SUMMARY OF THE INVENTION

One aspect of the present invention is directed to a method performed by a policy and charging rules node (PCRN) in a packet switching network, for managing default bearers. The method comprises steps of: receiving at the PCRN, a request message to establish a new bearer for an Internet protocol connectivity access network (IP-CAN) session; determining whether the request message includes a request for a service data flow; and if the request message does not include a request for a service data flow: determining whether the IP-CAN session has an existing bearer with no flow associated with it; and if the IP-CAN session has no existing bearer with no flow associated with it: establishing the new bearer; and identifying the new bearer as a default bearer for the IP-CAN session.

In some embodiments of the present invention, the step of identifying the new bearer as a default bearer for the IP-CAN session further comprises a step of identifying a previous default bearer as not being a default bearer.

In some embodiments of the present invention, the step of determining whether the IP-CAN session has an existing bearer with no flow associated with it comprises determining if an existing default bearer has no flow associated with it.

In some embodiments of the present invention, if the IP-CAN session has an existing bearer with no flow associated with it: rejecting the request to establish the new bearer.

In some embodiments of the present invention, the packet switching network comprises a general packet radio service (GPRS) network.

Another aspect of the present invention is directed to a method performed by a policy and charging rules node (PCRN) in a packet switching network, for managing default bearers, the method comprising steps of: receiving at the PCRN, a request message to remove a first service data flow from a first bearer associated with an Internet protocol connectivity access network (IP-CAN) session; determining whether first bearer has service data flows other than the first service data flow; and if the first bearer has no service data flows other than the first service data flow: determining whether the first bearer is identified as a default bearer for the IP-CAN session; and if the first bearer is not identified as a default bearer for the IP-CAN session: determining whether a default bearer for the IP-CAN session has at least one service data flow; and if the default bearer for the IP-CAN session has at least one service data flow: removing the first service data flow from the first bearer; and identifying the first bearer as a default bearer for the IP-CAN session.

In some embodiments of the present invention, the step of identifying the first bearer as a default bearer for the IP-CAN session further comprises a step of identifying a previous default bearer as not being a default bearer.

In some embodiments of the present invention, the packet switching network comprises a general packet radio service (GPRS) network.

Another aspect of the present invention is directed to a policy and charging rules node (PCRN) for handling an incoming request message, the PCRN comprising: at least one interface configured to receive a credit control request (CCR) message from a policy and charging enforcement node (PCEN); wherein the PCRN is configured to perform the method steps described above.

Another aspect of the present invention is directed to a program storage device readable by a machine, tangibly embodying a program of instructions executable by the machine to perform method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Unlike EPS which manages default bearers transparently, the specifications for valid AVPs (Attribute Value Pairs) used in GPRS networks do not specifically identify a bearer as being the default.

Embodiments of the present invention enable identification of a default bearer from among one or more bearers associated with an IP-CAN session and a method of tracking which GPRS bearer is the default when trigger events cause a modification of the default bearer, e.g. modification of QoS or AMBR (Aggregate Maximum Bit Rate) of a GPRS bearer.

Various scenarios can trigger a change to the default bearer including but not limited to: transition of a subscriber from an "unknown" to a "known" subscriber; technology change from one cell to another as a subscriber roams within the network; a change to a subscriber tier such as moving from a basic service which carries all traffic over one bearer to an upgraded service which separates traffic and provides a "better" default bearer; transitioning between different levels of service as a function of time or day, such as for example, free voice service on evenings and weekends.

In 3GPP-compliant networks, data plane traffic is carried over virtual connections called service data flows (SDFs), which are, in turn, carried over IP-CAN bearers—virtual containers with unique QoS characteristics. Multiple SDFs can be carried per IP-CAN bearer. SDFs are also referred to as service flows or IP service flows. Each user equipment (UE) (e.g., a smart phone), requires a connection to the network. This connection to the network is represented as an IP-CAN session. Each IP-CAN session can carry one or more IP-CAN bearers.

Figure 1:
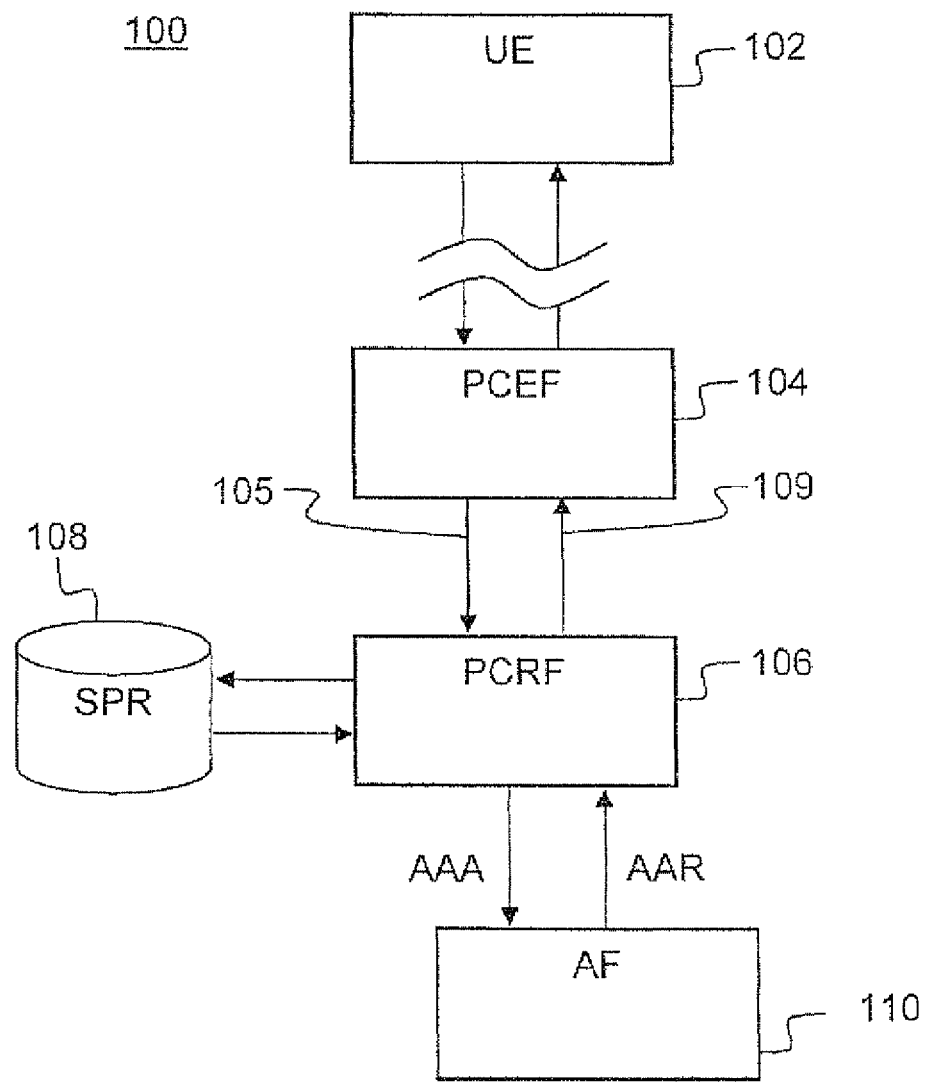
FIG. 1 illustrates a simplified block diagram of a GPRS system.

FIG. 1 illustrates a simplified block diagram of a GPRS system 100. A subscriber's User Equipment 102, which can be a mobile device capable of carrying IP traffic such as a smart phone, communicates with a PCEF function 104, also known as a policy and charging enforcement node (PCEN), which can be part of a Packet Data Network-Gateway (PDN-GW) (also referred to as a packet gateway (PGW) node), to initiate a request for service. The PCEF generates a Credit Control Request (CCR) message, such as CCR 105, requesting an appropriate allocation of resources and forwards the request to PCRF node 106, also known as a policy and charging rules node (PCRN). The CCR message to PCRF node 106 includes a QoS Information AVP containing the QoS requested by the subscriber. The PCRF node validates the message (syntax, semantics) and then retrieves subscriber data from Subscription Profile Repository (SPR) 108, to determine if the subscriber is valid, and the subscriber's QCI limit for the QCI specified in the request. Generally, the SPR 108 may store the following information, but not limited to, per subscriber, for non-Guaranteed Bit-Rate (non-GBR) calls: the bandwidth limits for each non-GBR QCI; the bandwidth limits for a given application such as voice calls, Voice Over IP (VOIP) calls, or for specific applications such as, for example, Skype or Google Talk. The SPR 108 may be a device that stores information related to subscribers to the network 100. Thus, SPR 108 may include a machine-readable storage medium such as read-only memory (ROM), random-access memory (RAM), magnetic disk storage media, optical storage media, flash-memory devices, and/or similar storage media. SPR 108 may be a component of PCRF node 106 or may constitute an independent node within network 100. Data stored by SPR 108 may include an identifier of each subscriber and indications of subscription information for each subscriber such as bandwidth limits, charging parameters, subscriber priority, and subscriber service preferences.

Figure 2:
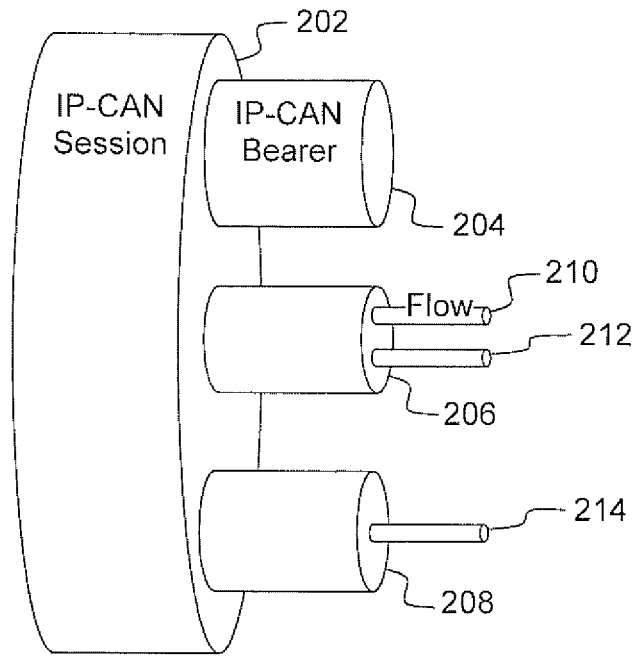
FIG. 2 illustrates elements of an IP-CAN session.

Referring to FIG. 2, a GPRS IP-Can session 202 defines a communication session established by a subscriber per a given Access Point Name (APN)/Packet Data Protocol (PDP) address. The IP-CAN session can support multiple IP-CAN bearers 204, 206, 208, which in turn can support multiple Service Data Flows (SDF) 210, 212, 214. SDFs are also referred to as SDF flows, data flows, or "filters". The 3GPP GPRS specification requires that no more than one bearer such as bearer 204 can have no SDF flows. The GPRS specifications are silent on the concept of a default bearer but the concept of default bearer has been introduced in the 3GPP specifications for EPS. Embodiments of the present invention provide some of the benefits of a default bearer to GPRS IP-CAN sessions.

Figure 3:
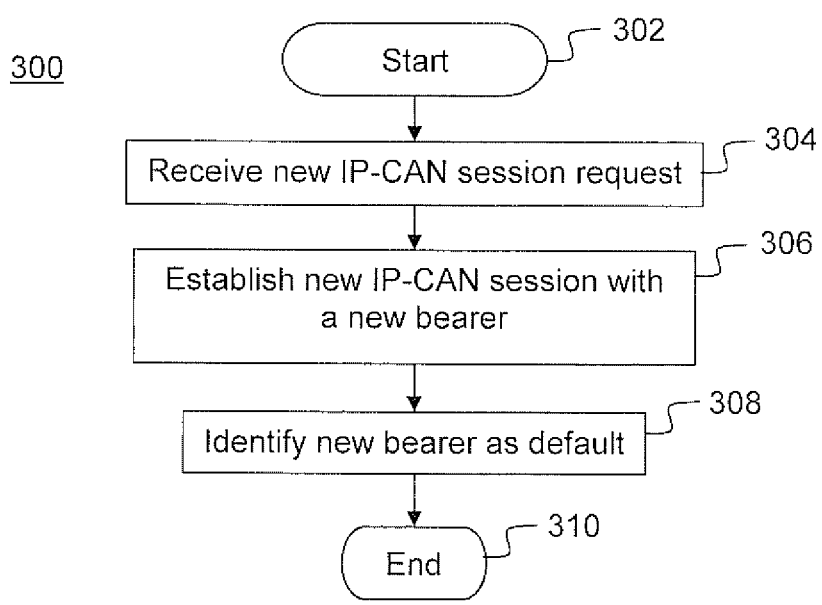
FIG. 3 illustrates a method of identifying a default bearer according to a first aspect of an embodiment of the present invention.

Referring to FIG. 3, method 300 identifies a bearer associated with the creation of a new GPRS IP-CAN session, as a default bearer. The method starts at step 302. At step 304 the PCRF 106 receives a new IP-CAN session request via a CCR message 105 which includes a QoS Information AVP containing the QoS requested by the subscriber associated with user equipment 102. At step 306 the PCRF 106 establishes the new IP-CAN session and creates a new bearer with no service data flows as specified by the GPRS specification. PCRF node 106 maintains a local database to store information for IP-CAN sessions and bearers related to those IP-CAN sessions. At step 308, the PCRF 106 identifies this new bearer as a default bearer by setting a flag or setting a bit, associated with the new bearer in the database of the PCRF 106 or by other suitable means as would be apparent to persons of skill in the art. By having a "default" flag for each bearer or other suitable identification system, GPRS bearers can now be identified as the default, the default bearer can be changed and tracked by the PCRF 106 as described below with reference to FIGS. 4 and 5. GPRS specifications permit only one bearer associated with an IP-CAN session to be without flows, therefore the methods described below should accommodate this requirement in order to remain compliant with the GPRS specifications.

Figure 4:
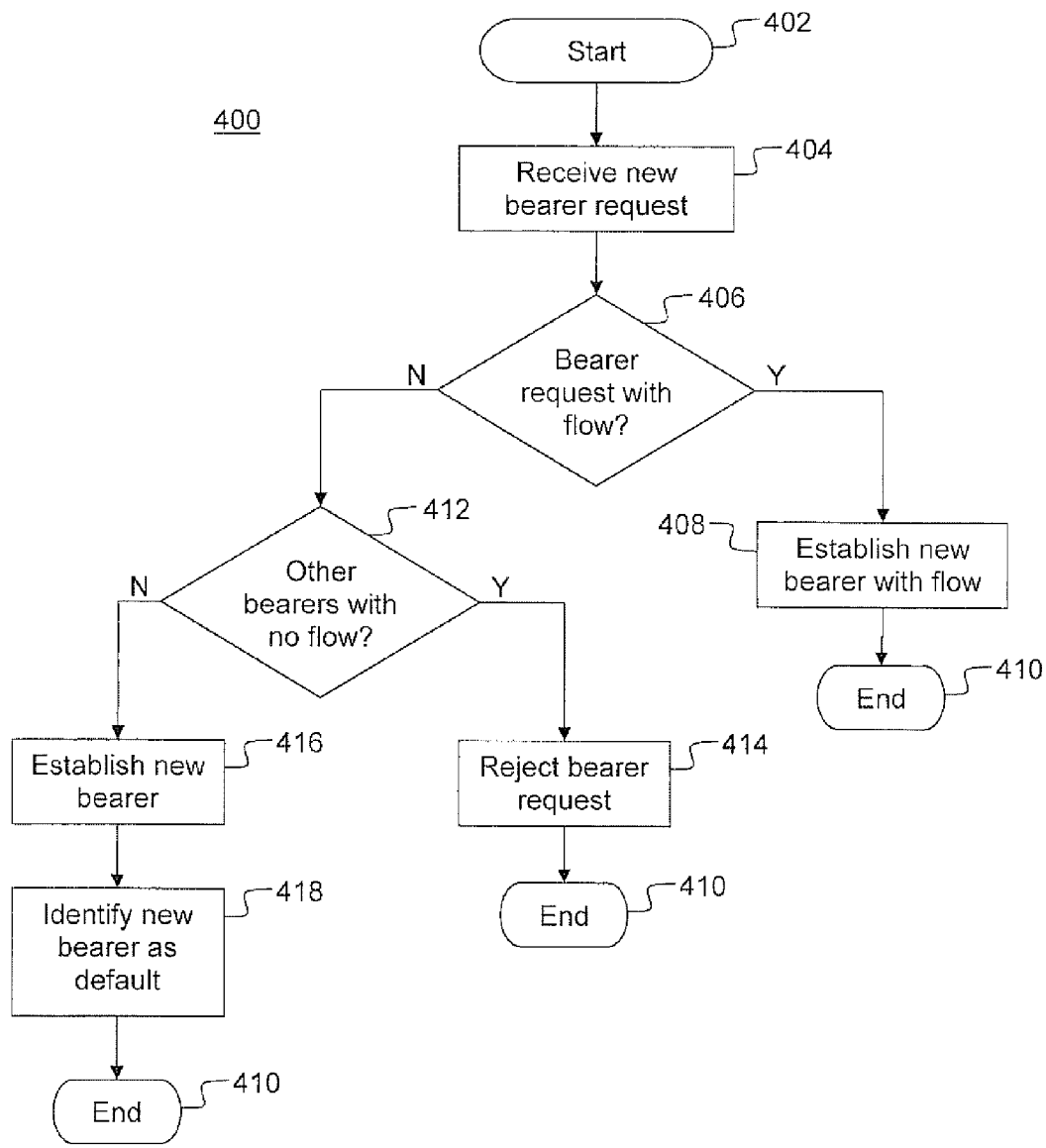
FIG. 4 illustrates a method of tracking a default bearer according to a second aspect of an embodiment of the present invention.

Subsequent to creating the initial bearer with no flows during the establishment of the IP-CAN session, flows may now be added to this bearer. Adding flows to the identified default bearer or to any other bearer on the IP-CAN session will not affect the default status of the bearer. Referring to FIG. 4, a method 400 tracks a default bearer as an additional bearer is added to an IP-CAN session. The method starts at step 402. At step 404 the PCRF 106 receives a request from PCEF 104 via a CCR message to establish a new bearer. At step 406, the PCRF 106 determines if the CCR message also includes a request to establish an SDF flow and if it does, the process proceeds to step 408 where the PCRF 106 establishes the new bearer with the flow. The process then ends at step 410. If at step 406 PCRF 106 determines that the CCR message to establish a bearer does not include a request to establish an SDF flow then the process moves to step 412 where the PCRF 106 determines if there is another bearer on the IP-CAN session that doesn't have an SDF flow associated with it, by querying the IP-CAN session data in the corresponding subscriber's subscription profile on SPR 108. If the PCRF 106 determines that there is another bearer on the IP-CAN session that doesn't have an SDF flow associated with it, then the process proceed to step 414 where the PCRF 106 rejects the bearer request in order not to violate the GPRS requirement that only one bearer per IP-CAN session has no flow. The process then ends at step 410.

If at step 412 the PCRF 106 determines that there are no other bearers on the IP-CAN session without SDF flows then the process proceeds to step 416 where the PCRF 106 establishes the new bearer. At step 418 the PCRF 106 identifies the new bearer as the default bearer on the IP-CAN session. In one embodiment, this entails setting a "default" flag associated with the new bearer in corresponding subscriber's subscription profile on SPR 108 and ensuring that all other bearers on the IP-CAN session for this subscriber have the corresponding "default" flag reset or disabled so that only one bearer is identified as the default bearer. The process then ends at step 410. In some embodiments, the default bearer can be identified by providing a memory storage on the SPR 108 to store an identifier of the bearer deemed to be the default bearer for the IP-CAN session, in which case step 418 can be accomplished in one operation, as would be apparent to persons skilled in the art.

This method can provide PCRF nodes in GPRS systems the functionality to be able to identify and track default bearers which is currently not defined by the GPRS specification. This may enhance the flexibility of the system to rearrange bearers and flows while tracking a default bearer and facilitate the handling of certain message flows and restrictions which would affect only a default bearer and not dedicated bearers.

Figure 5:
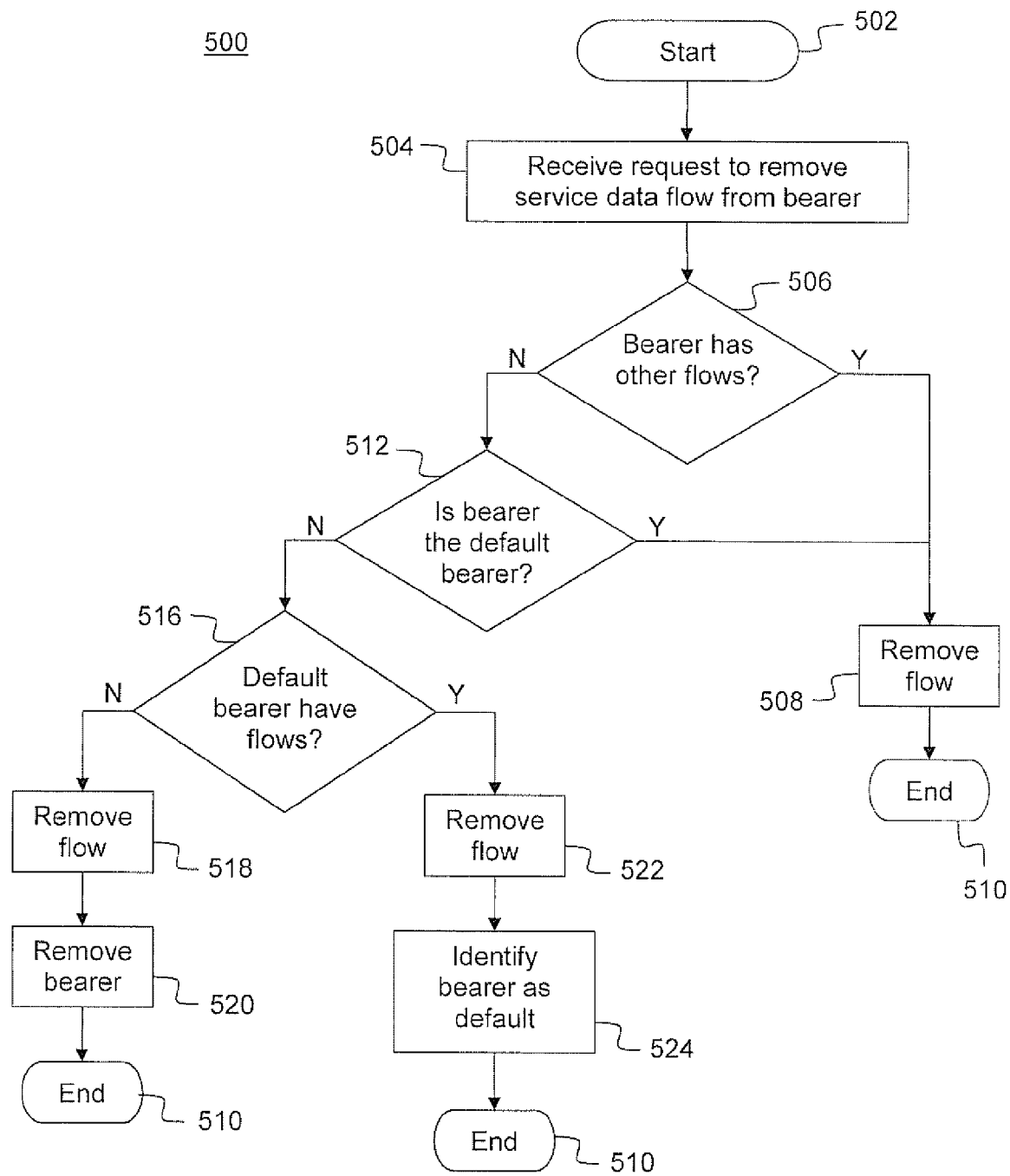
FIG. 5 illustrates a method of tracking a default bearer according to a third aspect of an embodiment of the present invention.

Referring to FIG. 5, a method 500 tracks a default bearer as a service data flow is removed from a bearer on an IP-CAN session. The method starts at step 502. At step 504 the PCRF 106 receives a request from PCEF 104 via a CCR message to modify a bearer on an IP-CAN session by removing a service data flow from the bearer. At step 506, the PCRF 106 determines if the subject bearer has at least one other service data flow, by querying the IP-CAN session data in the corresponding subscriber's subscription profile on SPR 108, and if it does, the process proceeds to step 508 where the PCRF 106 removes the service data flow as requested. The process then ends at step 510. If at step 506 the PCRF 106 determines that the subject bearer has no other service data flows then the process proceeds to step 512 where the PCRF 106 determines if the subject bearer is the default bearer for the IP-CAN session and if it is, the process proceeds to step 508 as described previously. If at step 512 the PCRF 106 determines that the subject bearer is not the default bearer for the IP-CAN session, then the process proceeds to step 516 where the PCRF 106 determines if the default bearer has at least one service data flow. If at step 516, the PCRF 106 determines that the default bearer does not have at least one service data flow then the process proceeds to step 518 where the PCRF 106 removes the service data flow from the subject bearer as requested. The process then proceeds to step 520 where the PCRF 106 also terminates the subject bearer from the IP-CAN session in order to avoid having two bearers on the same IP-CAN session with no service data flows. The process then ends at step 510.

If at step 516, the PCRF 106 determines that the default bearer has at least one service data flow then the process proceeds to step 522 where the PCRF 106 removes the service data flow from the subject bearer as requested. The process then proceeds to step 522 where the PCRF 106 identifies the subject bearer as the default bearer on the IP-CAN session. The process then ends at step 510. In this manner, the PCRF 106 can accommodate modifications to bearers and service data flows while dynamically updating and tracking a current default bearer while observing the requirements of the GPRS specification.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially rep-

What is claimed is:

1. A method performed by a policy and charging rules node (PCRN) in a packet switching network for managing default bearers, the method comprising:
   receiving, at the PCRN, a request message to establish a new bearer for an Internet protocol connectivity access network (IP-CAN) session;
   determining whether said request message includes a request for a service data flow (SDF); and, if said request message does not include the request for the SDF:
   determining whether said IP-CAN session has an existing bearer with no SDF associated with it; and, if said IP-CAN session has no existing bearer with no SDF associated with it:
   establishing said new bearer with no SDF; and
   identifying said new bearer, in a Subscription Profile Repository (SPR), as a default bearer for said IP-CAN session.

2. The method of claim 1, further comprising:
   identifying a previous default bearer as not being the default bearer.

3. The method of claim 1, further comprising:
   determining if an existing default bearer has no SDF associated with it.

4. The method of claim 1, wherein if said IP-CAN session has the existing bearer with no flow associated with it:
   rejecting the request to establish the new bearer.

5. The method of claim 1, wherein said packet switching network comprises a general packet radio service (GPRS) network.

6. The method of claim 1, further comprising:
   setting a default flag associated with the new bearer in a corresponding subscription profile in the SPR.

7. The method of claim 1, further comprising: disabling the default flag in subscription profiles in the SPR that correspond to all other bearers.

8. The method of claim 1, further comprising: storing an identifier of the default bearer in the SPR.

9. A method performed by a policy and charging rules node (PCRN) in a packet switching network for managing default bearers, the method comprising:
   receiving, at the PCRN, a request message to remove a first service data flow (SDF) from a first bearer associated with an Internet protocol connectivity access network (IP-CAN) session;
   determining whether first bearer has SDFs other than said first SDF; and, if said first bearer has no SDFs other than said first SDF:
   determining whether said first bearer is identified as a default bearer for said IP-CAN session; and, if said first bearer is not identified as a default bearer for said IP-CAN session:
   determining whether the default bearer for said IP-CAN session has at least one SDF; and if said default bearer for said IP-CAN session has at least one SDF:
   removing said first SDF from said first bearer; and
   identifying said first bearer with no SDF, in a Subscription Profile Repository (SPR), as a new default bearer for said IP-CAN session.

10. The method as claimed in claim 9, further comprising:
    identifying a previous default bearer as not being the default bearer.

11. The method of claim 9, wherein said packet switching network comprises a general packet radio service (GPRS) network.

12. The method of claim 9, further comprising: setting a default flag associated with the new bearer in a corresponding subscription profile in the SPR.

13. The method of claim 9, further comprising: disabling the default flag in subscription profiles in the SPR that correspond to all other bearers.

14. The method of claim 9, further comprising: storing an identifier of the default bearer in the SPR.

15. A policy and charging rules node (PCRN) for handling an incoming request message, the PCRN comprising:
    at least one interface configured to receive a credit control request (CCR) message from a policy and charging enforcement node (PCEN); wherein said PCRN is configured to perform the method of claim 1.

16. A program storage device readable by a machine, tangibly embodying a program of instructions executable by the machine to perform the method of claim 1.

* * * * *